US011066532B2

(12) United States Patent
Aliperta et al.

(10) Patent No.: US 11,066,532 B2
(45) Date of Patent: Jul. 20, 2021

(54) PROCESS FOR THE PRODUCTION OF EXPANDED MATERIAL BASED ON SULFONE POLYMERS

(71) Applicant: DIAB International AB, Laholm (SE)

(72) Inventors: Luigi Aliperta, Rivamonte Agordino (IT); Raffaela Bressan, Oderzo (IT); Stephen Leonard Jackson, Mesquite, TX (US); Robert Wayne Shelton, Carrollton, TX (US)

(*) Notice: Subject to any disclaimer, the term of this patent is extended or adjusted under 35 U.S.C. 154(b) by 61 days.

(21) Appl. No.: 16/475,089

(22) PCT Filed: Jan. 15, 2018

(86) PCT No.: PCT/EP2018/050901
§ 371 (c)(1),
(2) Date: Jun. 29, 2019

(87) PCT Pub. No.: WO2018/137958
PCT Pub. Date: Aug. 2, 2018

(65) Prior Publication Data
US 2019/0330435 A1 Oct. 31, 2019

(30) Foreign Application Priority Data
Jan. 25, 2017 (IT) .................. 102017000007916

(51) Int. Cl.
| C08J 9/04 | (2006.01) |
| B29C 44/34 | (2006.01) |
| C08J 9/00 | (2006.01) |
| B29C 44/50 | (2006.01) |
| B29K 81/00 | (2006.01) |
| B29K 105/04 | (2006.01) |
| B29K 105/26 | (2006.01) |

(52) U.S. Cl.
CPC ......... *C08J 9/0061* (2013.01); *B29C 44/3402* (2016.11); *B29C 44/50* (2013.01); *B29K 2081/06* (2013.01); *B29K 2105/046* (2013.01); *B29K 2105/26* (2013.01); *B29K 2995/0063* (2013.01); *C08J 2201/03* (2013.01); *C08J 2205/052* (2013.01); *C08J 2381/06* (2013.01); *C08J 2400/30* (2013.01); *C08J 2481/06* (2013.01)

(58) Field of Classification Search
CPC ................. C08J 9/0061; C08J 2201/03; C08J 2205/052; C08J 2381/06; C08J 2400/30; C08J 2481/06; C08J 9/0066; C08J 9/12; B29C 44/3402; B29C 44/50; B29K 2081/06; B29K 2105/046; B29K 2105/26; B29K 2995/0063
See application file for complete search history.

(56) References Cited

U.S. PATENT DOCUMENTS

| 4,308,352 | A | * | 12/1981 | Knaus | ................. | C08J 9/143 |
| | | | | | | 521/79 |
| 2004/0167241 | A1 | * | 8/2004 | Scherzer | ............. | B29C 44/5654 |
| | | | | | | 521/79 |

* cited by examiner

*Primary Examiner* — Kara B Boyle
(74) *Attorney, Agent, or Firm* — Themis Law

(57) ABSTRACT

A process for the production of expanded material based on sulfone polymers includes an extrusion step in an extruder of virgin sulfone polymer with the injection of at least one expanding agent and in the presence of at least one nucleating agent, and a recycling step of part of the expanded material, which provides a recycled product used as raw material fed to the extruder in combination with the virgin sulfone polymer.

11 Claims, 2 Drawing Sheets

PROCESS FOR THE PRODUCTION OF EXPANDED MATERIAL BASED ON SULFONE POLYMERS

The present invention relates to an improved process for the production of expanded material based on sulfone polymers.

The field of the invention relates to the production of foams or expanded sulfone polymer, as obtained starting from the corresponding virgin polymer.

The document US 2004/0167241 discloses a process for the production of an expanded material based on a sulfone polymer, in particular on a polyether sulfone, wherein the virgin material and a nucleating agent are feed into an extruder and melted, followed by the injection of a blowing agent and extrusion.

The process comprises carrying out the foaming at a melt temperature which is higher, by from 2 to 20° C., than the temperature at which a closed-cell foam id formed.

As variant of the process for producing an open-cell foam can be used a foaming plastic which comprises a pulverulent solid which acts as cell-opener.

The process is for the production of an open-cell foam used for sound deadening.

In the process to which the invention refers, a nucleating agent is added to a virgin sulfone polymer, for example a synthetic polyethersulfone, which is then brought to melting point. An expanding agent is subsequently first injected into the molten product, which is then cooled inside an extruder and, after passing through a spinneret, the polymer thus obtained expands instantaneously, generating the foam or final expanded product.

In the field of application considered in the present invention, the use of a polymer of the group of sulfone polymers is preferred, as this material has thermal-, mechanical- and flame-resistance properties which are particularly desirable for the end-products.

The polymers of the group of sulfone polymers used for these applications are virgin, i.e. obtained directly from synthesis and have the following structural formula:

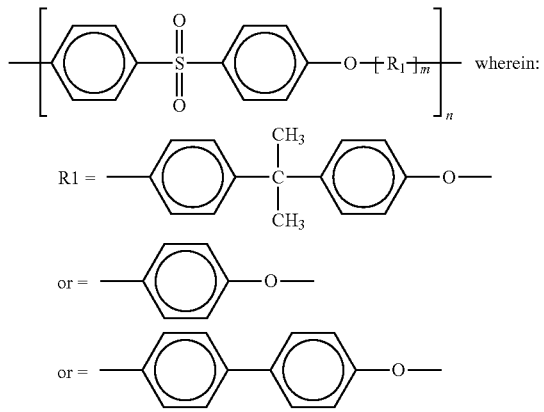

wherein n=60-400
m=0.1

The polymers of the group of sulfone polymers to which the invention relates are characterized in particular by a glass transition temperature Tg of at least 180° C., as measured according to the standard DIN EN ISO 11357 with DSC (differential scanning calorimetry), under the following conditions:

equilibrium at 0° C.
temperature rise at 20° C./min from 0 to 340° C.
isotherm at 340° C. for 5 minutes
cooling at 20° C./min from 340° C. to 0° C.
isotherm 5 minutes
temperature rise at 20° C./min from 0 to 340° C.

The Tg is calculated as maximum flexion of the curve during the glass transition in the second temperature rise.

The above-mentioned polymers are also preferred due to the intrinsic viscosity value (IV) of at least 30 ml/g, as measured under the following conditions:
standard DIN EN ISO 1628-1
concentration analyzed from 0.008 to 0.013 g/ml
solvent phenol:tetrachloroethane (60:40)
Uhbbelold IC capillary
analysis temperature at 30° C.

The intrinsic viscosity IV is calculated as ml/g from straight-line regression of the viscosity reduced in relation to the various concentrations to a concentration value equal to 0, as indicated under item 9.1 of the standard DIN EN ISO 1628-1.

The virgin polymers of the group of sulfone polymers described, however, have the disadvantage of being extremely costly materials. In addition, the processes in which they are used, at times involve the formation of considerable quantities of scraps which must be treated to avoid creating problems of environmental impact.

The objective of the present invention is to provide an improved process for the production of expanded material based on sulfone polymers which, unlike the known processes of the same type, allows not only a virgin or synthetic sulfone polymer to be used as starting material, but also a recovered sulfone polymer.

The objective of the present invention is also to provide an expanded material from sulfone polymer.

A further objective of the invention is to reduce the cost of the overall production process of expanded material from sulfone polymers, also allowing the recovery of the expanded product obtained in the process, reducing the drawbacks linked to the environmental impact of the same.

These and other objectives are achieved with the process of claim 1. Preferred embodiments of the invention are evident from the remaining claims.

With respect to the known processes for the production of expanded polymeric material based on sulfone polymers, the process of the invention offers the advantage of providing a recovered expanded sulfone polymer, which can be used as raw material for the production of expanded material based on sulfone polymers.

Thanks to the invention, it is therefore possible to reduce the quantities of raw material based on virgin sulfone polymer, which is more valuable and costly, with evident advantages with respect to both the cost of the raw material used, and also the problems of environmental impact linked to the production of expanded products based on sulfone polymers.

These and further objectives, advantages and characteristics are evident from the following description of some preferred embodiments of the process of the invention illustrated, for illustrative and non-limiting purposes, in the figures of the enclosed drawings.

In these:

Figure 1:
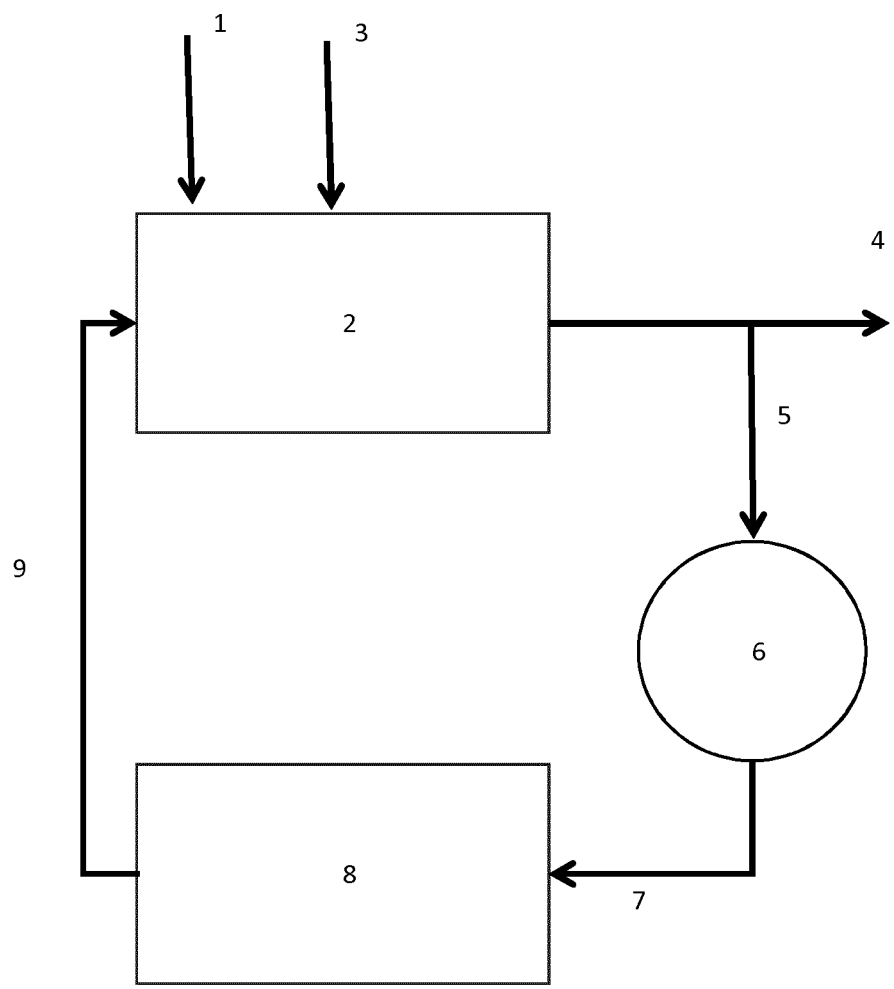
FIG. 1 illustrates a block scheme of the process of the invention, with recycling of the expanded sulfone polymer treated in an agglomeration step.

In the embodiment illustrated in FIG. 1, a nucleating agent is first added to a virgin or synthetic sulfone polymer 1 which is then introduced into an extruder 2, in which the melting temperature of the polymer is reached. An expanding agent 3 is then injected into the molten polymeric mass, which, after mixing and subsequent cooling, is passed through a spinneret so as to form a foam 4 consisting of an expanded material of sulfone polymer having a density of 20-200 kg/m$^3$.

The expanded material from sulfone polymer obtained with the process here disclosed and claimed, has a closed-cell structure.

The expanded material has over 80% of closed cells, determined accordingly to the ASTM D 2856 procedure A.

The closed cells is mandatory characteristics in the field of the application in order to guaranty the best combination of thermal resistance and mechanical performance. The utilization of sulfone polymer with high enough IV, virgin 1 and recycled 9,11, it is important in order to maintain right strength in the melt to be able to nucleate (with the support of a nucleating agent) in small and stable closed cells the blowing agent 3 that expands at the end of the extruder 2.

Polymers suitable for the purpose are polyethersulfone, polysulfone, polyphenylsulfone and polyether-ethersulfone.

According to the invention, a part 5 of expanded sulfone polymer 4 is treated in a grinding device 6, from which grinded material 7 is obtained.

From said grinding device 6 are obtained particles 7 of recovered expanded material, having dimensions of 0.1-10 mm. The above-mentioned particles 7 (grinded material) are subsequently treated in an agglomeration device 8, which provides for drawing the grinded product through the holes of a die-plate in which the grinded material, for a time in the order of a fraction of a second, and with heating lower than the melting point of the sulfone polymer, is compacted into a dense granule which forms an agglomerate.

In particular, in the agglomeration step 8 described, the grinded material 7 obtained in the previous step is fed to an agglomeration chamber using a dosage screw. The heating by friction and high pressure created by forcing the grinded material to pass through the holes of the die, cause the agglomeration of the expanded polymeric material.

The temperature of the agglomeration process is below the melting point of the grinded polymer 7 and the residence time of the same polymer in the agglomeration chamber is only a fraction of a second.

The polymeric material that passes through the holes of the die is then cut with rotating knives and is sent by the cooling air into a granulator.

An example of the equipment that can be used in the process of the invention is described in the publications U.S. Pat. No. 7,335,008B2 and U.S. Pat. No. 7,927,388B2, but it is to be understood that the process of the invention is in no way limited to this type of equipment. Different types of systems can in fact be used, provided they are compatible with the formation of an agglomerate, starting from expanded sulfone polymer.

Viscosity analyses with a capillary tube, according to the standard DIN EN ISO 1628-1 indicated above, show that the material 9 obtained from the agglomeration process of the recovery 5 of expanded sulfone material 4 has intrinsic viscosity IV and glass transition temperature Tg values very close to the analogous values of the corresponding starting virgin sulfone polymer 1. In this way, the recycled polymer described can be effectively used in processes for obtaining expanded sulfone polymers, in combination or in conjunction with the usual starting virgin polymer 1. In particular, the above-mentioned values relating to the agglomerate 9 obtained with the process of the invention are IV higher than or equal to 30 ml/g and Tg higher than or equal to 180° C. According to an example of the invention, the agglomerated polymer has IV=30-50 ml/g and Tg=223-228° C.

The agglomeration product 9 is also characterized by a density higher than or equal to 1,000 Kg/m$^3$. The density value described is particularly appropriate for the process of the invention, as it is suitable for the gravimetric dosing of the virgin sulfone polymer 1 inside the extruder 2.

According to the invention, the starting polymer used for the production of the expanded sulfone polymer 4 therefore consists not only of the corresponding virgin sulfone polymer 1, but also the agglomerate 9 obtained by the agglomeration device 8, in a quantity ranging from 20 to 80% by weight with respect to the weight of the corresponding virgin polymer 1.

Figure 2:
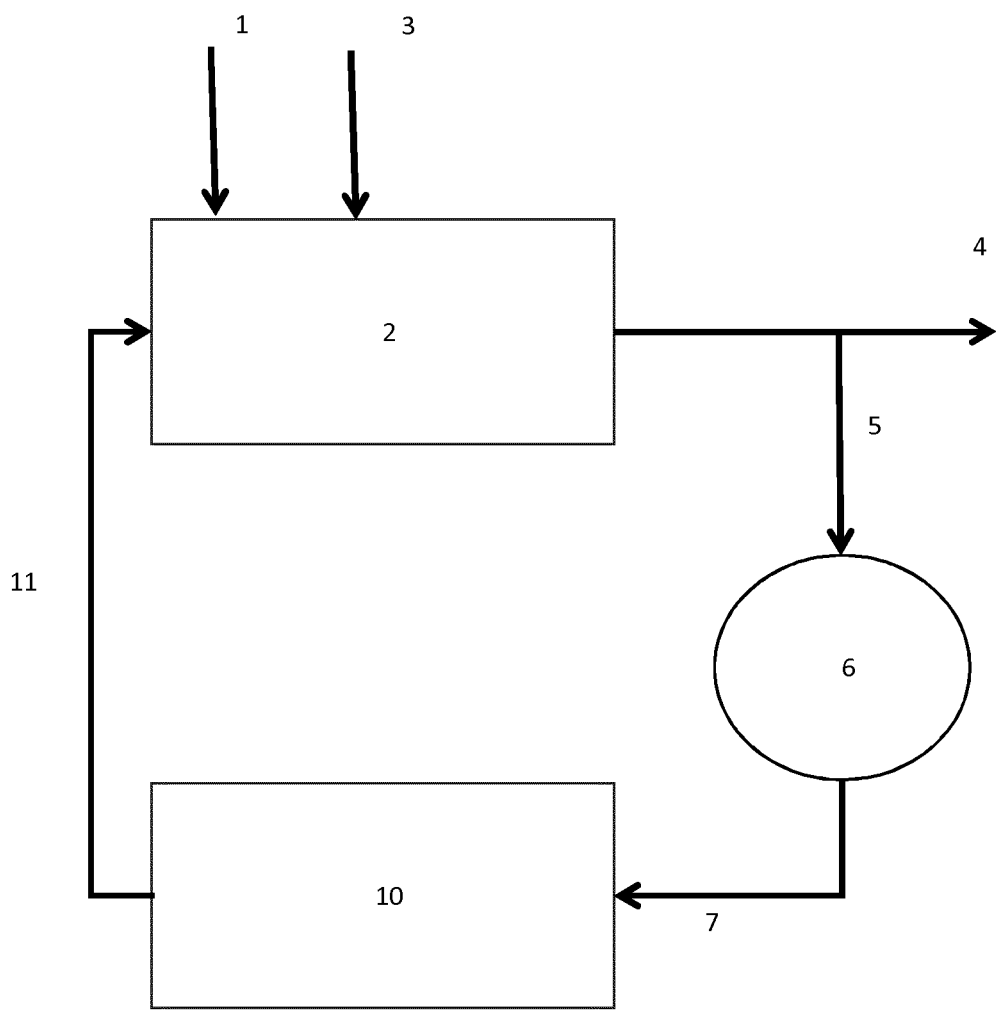
FIG. 2 illustrates a block scheme of a variant of the process of the invention, with recycling of the expanded sulfone polymer treated in a re-extrusion step.

According to the variant illustrated in FIG. 2, an extruder 10 is used instead of the agglomeration device 8 described, in which the grinded product 7 of expanded polymer 4, as obtained from the grinding device 6, is treated.

In the example described, the product 11 resulting from the extrusion step 10 is a degassed granulate, also used in combination with the virgin sulfone polymer 1 as raw material sent to the extruder 2 in a quantity ranging from 20 to 80% by weight with respect to the weight of the corresponding virgin sulfone polymer 1.

According to the claimed process said recycled product 9,11 of expanded material 4 is introduced into the above-mentioned extruder 2 in a quantity ranging from 20 to 80% by weight with respect to the weight of virgin polymer 1.

Some examples of formulations of the polysulfone foam 3 are provided hereunder, wherein the percentages refer to the weight of the mixture.

Example 1—Use of Virgin Sulfone Polymer Alone

The following components were introduced into the extruder 2, wherein the quantities are expressed in weight %:

virgin polyethersulfone 1 (PES) (Tg=227.1° C.; IV=43.4 ml/g; density=1,300 Kg/m$^3$) (95.2-96.2%)

talc in powder form as nucleating agent (0.2-1.3% with respect to PES).

The expanding agent 3 (3.3-3.7%) was added through the injection point.

The expanded material 4 obtained, having a density of 60 Kg/m$^3$, has a good cellularity with an average cell size of 0.28 mm and over 95% of closed cells. The compression test carried out according to the standard ASTM DIN 1621-A on a sample having dimensions of 40×25×30 cm, gives a resistance value of 0.687 MPa, and a compression modulus of 34.58 MPa.

Example 2—Use of Equal Parts of Virgin Sulfone Polymer and Agglomerate Obtained from Expanded Material (Agglomerate of Example 1)

The following components were introduced into the extruder 2, wherein the quantities are expressed in weight %:

virgin polyethersulfone 1 (PES) (Tg=227.1° C.; IV=43.4 ml/g; density=1,300 Kg/m$^3$) (47.6-48.3%)

agglomeration granule 9 from the recovery 5 of expanded material 4 (Tg=225.8° C.; IV=41.3 ml/g; density=1,050 Kg/m$^3$) (47.6-48.3%)

talc in powder form as nucleating agent (0.2-1.2% with respect to PES+agglomeration granule).

The expanding agent 3 (3.3-3.7%) was added through the injection point.

The expanded material 4 obtained, having a density of 60 Kg/m$^3$, has a good cellularity with an average cell size of 0.29 mm and over 95% of closed cells. The compression test carried out according to the standard ASTM DIN 1621-A on a sample having dimensions of 40×25×30 cm, gives a resistance value of 0.676 MPa, and a compression modulus of 34.36 MPa.

Example 3—Use of Parts of Virgin Sulfone Polymer and Granules Obtained from the Recycling of the Expanded Material of Example 1 or 2 According to the Following Quantities Expressed in Weight %

| virgin polyethersulfone 1 (PES) (Tg = 227.1° C.; IV = 43.4 ml/g; density = 1,300 Kg/m$^3$) | agglomeration granule 9 from the recovery 5 of expanded material 4 (Tg = 225.8° C.; IV = 41.3 ml/g; density = 1,050 Kg/m$^3$) |
| --- | --- |
| ~100% | ~0 |
| ~80% | ~20% |
| ~60% | ~40% |
| ~40% | ~60% |
| ~20% | ~80% |

The following components can be introduced into the extruder 2, wherein the quantities are expressed in weight %:

talc in powder form as nucleating agent (0.2-1.2% with respect to PES+agglomeration granule).

The expanding agent 3 (3.3-3.7%) was added through the injection point.

The expanded material 4 obtained according to the above mentioned combinations of virgin polyethersulfone 1 (PES) and agglomeration granule 9 from the recovery 5 of expanded material 4, having a density of 60 Kg/m$^3$, has a good cellularity with an average cell size below 0.3 mm and over 95% of closed cells. The compression test carried out according to the standard ASTM DIN 1621-A on a sample having dimensions of 40×25×30 cm, gives a resistance value of about 0.67-0.69 MPa, and a compression modulus of about 34-35 MPa.

Example 4—Use of Equal Parts of Virgin Sulfone Polymer and Granules Obtained from the Re-Extrusion of the Expanded Material of Example 1

The following components were introduced into the extruder 2, wherein the quantities are expressed in weight %:

virgin polyethersulfone 1 (PES) (Tg=227.1° C.; IV=43.4 ml/g; density=1,300 Kg/m$^3$) (47.6-48.3%)

re-extrusion granule 11 from the recovery 5 of expanded material 4 (Tg=224.7° C.; IV=32.5 ml/g; density=1,400 Kg/m$^3$) (47.6-48.3%)

talc in powder form as nucleating agent (0.2-1.2% with respect to PES+re-extrusion granule).

The expanding agent 3 (3.3-3.7%) was added through the injection point.

The expanded material 4 obtained, having a density of 60 Kg/m$^3$, has a good cellularity with an average cell size of 0.31 mm and over 95% of closed cells. The compression test carried out according to the standard ASTM DIN 1621-A on a sample having dimensions of 40×25×30 cm, gives a resistance value of 0.665 MPa, and a compression modulus of 34.0 MPa.

Example 5—Use of Small Parts of Virgin Sulfone Polymer with High Part of Granules (11) Obtained from the Re-Extrusion (10) of the Expanded Material of Example 1

The following components were introduced into the extruder 2, wherein the quantities are expressed in weight %:

virgin polyethersulfone 1 (PES) (Tg=227.1° C.; IV=43.4 ml/g; density=1,300 Kg/m$^3$) (17.6-18.3%)

re-extrusion granule 11 from the recovery 5 of expanded material 4 (Tg=224.7° C.; IV=32.5 ml/g; density=1,400 Kg/m$^3$) (77.6-78.3%)

talc in powder form as nucleating agent (0.2-1.2% with respect to PES+re-extrusion granule).

The expanding agent 3 (3.3-3.7%) was added through the injection point.

The expanded material 4 obtained, having a density of 60 Kg/m$^3$, has a cellularity with an average cell size of 0.34 mm and over 80% of closed cells. The compression test carried out according to the standard ASTM DIN 1621-A on a sample having dimensions of 40×25×30 cm, gives a resistance value of 0.58 MPa, and a compression modulus of 33.5 MPa.

According to the invention, the recycled polymer 9,11 and the virgin polymer 1 are employed non only equal amounts but also in increasing and decreasing amounts, respectively (% by weight), being said recycled product 9,11 of expanded material (4) introduced into the extruder 2 in a quantity ranging from 20 to 80% by weight and the virgin polymer 1 in a quantity ranging from 80 to 20% by weight.

In other words, the recycled polymer 9,11 is employed in an amount of 20 to 80% by weight, relative to the amount of the virgin polymer 1.

The invention claimed is:

1. A process for production of expanded material that includes a sulfone polymer, comprising:
   extruding, in an extruder, virgin sulfone polymer by injecting at least one expanding agent in presence of at least one nucleating agent to produce an expanded material; and
   recycling a part of said expanded material to produce a recycled product, fed as a raw material to the extruder in combination with said virgin sulfone polymer.

2. The process according to claim 1, wherein said recycled product consists of a product obtained in a grinding step of said expanded material to produce ground material and in a subsequent agglomeration step by drawing the ground material obtained in said grinding step.

3. The process according to claim 1, wherein said recycled product consists of a product obtained in a grinding step of the expanded material to produce ground material and in a subsequent extrusion step of said ground material obtained in said grinding step.

4. The process according to claim 1, wherein said recycled product has the following structural formula:

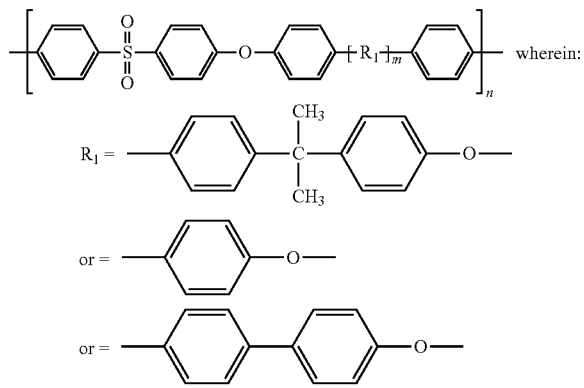 wherein:

wherein n=60-400 m=0.1.

5. The process according to claim 4, wherein said recycled product has:
a Tg value of at least 180° C. as measured according to standard DIN EN ISO 11357 with DSC (differential scanning calorimetry), under the following conditions:
equilibrium at 0° C.,
temperature rise at 20° C./min from 0 to 340° C.,
isotherm at 340° C. for 5 minutes,
cooling at 20° C./min from 340° C. to 0° C.,
isotherm 5 minutes,
second temperature rise at 20° C./min from 0 to 340° C., and
an IV value of at least 30 ml/g as measured according to standard DIN EN ISO 1628-1 under the following conditions:
concentration analyzed from 0.008 to 0.013 g/ml,
ratio solvent phenol: tetrachloroethane being (60:40);
using a Ubbelohde IC capillary,
analysis of temperature at 30° C., and
a density of at least 1000 Kg/m.

6. The process according to claim 2, wherein said ground material obtained in the grinding step of said expanded material in a grinding device consists of particles of said expanded material having a size ranging from 0.1 mm to 10 mm.

7. The process according to claim 2, wherein said drawing is carried out for a time in an order of a fraction of a second and at a temperature lower than a melting temperature of said sulfone polymer.

8. The process according to claim 1, wherein the recycled product is a polyethersulfone having:
an IV=30-50 ml/g as measured according to standard DIN EN ISO 1628-1 under the following conditions:
concentration analyzed from 0.008 to 0.013 g/ml,
a ration of solvent phenol: tetrachloroethane being (60: 40),
using a Ubbelohde IC capillary,
an analysis of temperature at 30° C.,
and
Tg=223-228° C. as measured according to standard DIN EN ISO 11357 with DSC (differential scanning calorimetry), under the following conditions:
equilibrium at 0° C.,
temperature rise at 20° C./min from 0 to 340° C.,
isotherm at 340° C. for 5 minutes,
cooling at 20° C./min from 340° C. to 0° C.,
isotherm for 5 minutes, and
a second temperature rise at 20° C./min from 0 to 340° C.

9. The process according to claim 1, wherein said sulfone polymer is selected from the group consisting of polysulfone, polyethersulfone, polyphenylsulfone, and polyether-ethersulfone.

10. The process according to claim 1, wherein said recycled product of the expanded material is introduced into the extruder in a quantity ranging from 20 to 80% by weight with respect to a weight of virgin polymer.

11. The process according to claim 3, wherein said ground material obtained in the grinding step of said expanded material in a grinding device consists of particles of said expanded material having a size ranging from 0.1 mm to 10 mm.

* * * * *